(No Model.)
O. STODDARD.
BASKET.
No. 476,498. Patented June 7, 1892.
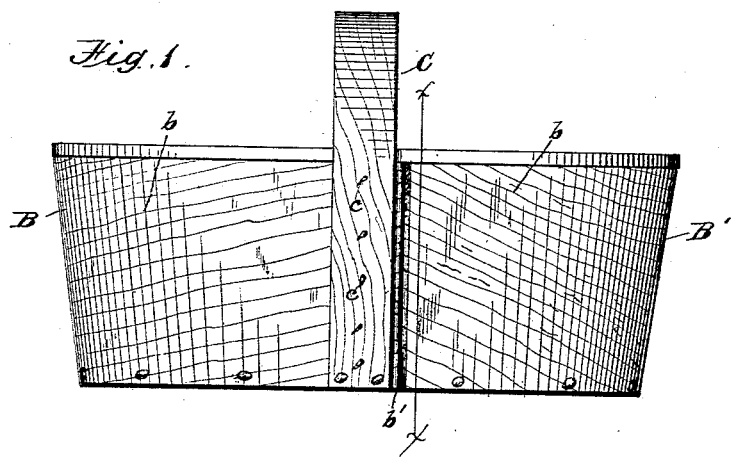
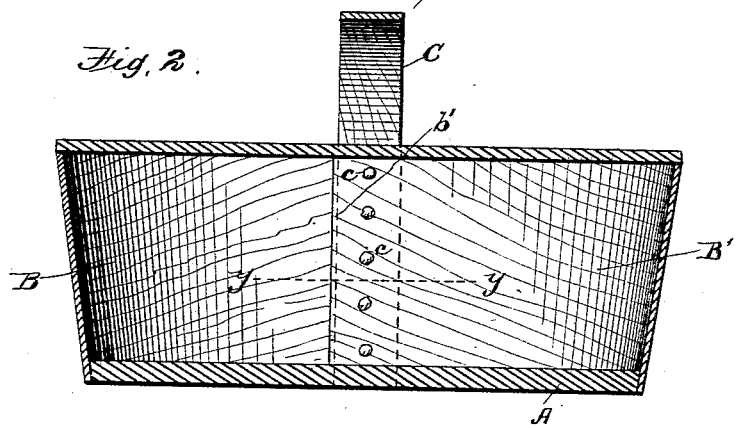
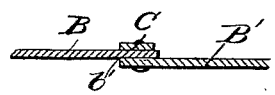
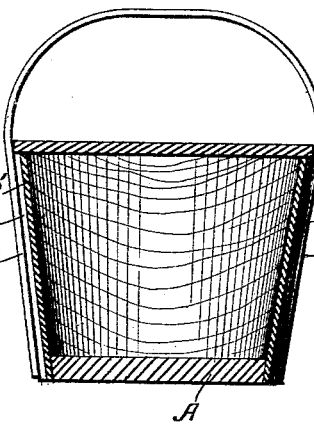
Witnesses
W. H. H. Knight
William O. Belt.
Inventor
Oren Stoddard,
By his Attorneys
Edson Bro's.

UNITED STATES PATENT OFFICE.

OREN STODDARD, OF BUSTI, NEW YORK.

BASKET.

SPECIFICATION forming part of Letters Patent No. 476,498, dated June 7, 1892.

Application filed January 23, 1892. Serial No. 419,025. (No model.)

*To all whom it may concern:*

Be it known that I, OREN STODDARD, a citizen of the United States, residing at Busti, in the county of Chautauqua and State of New York, have invented certain new and useful Improvements in Baskets; and I do hereby declare the following to be a full, clear, and exact description of the invention, such as will enable others skilled in the art to which it appertains to make and use the same.

My invention relates to improvements in baskets; and its objects are to provide a cheap and durable basket especially adapted to hold fruit and to reduce the number of pieces of which the basket is constructed.

With these and other ends in view the invention contemplates constructing a basket in four pieces comprising the bottom, two body-pieces, and the handle, which is arranged over the joint of the body-pieces and secured thereto in a suitable manner, and these body-pieces are cut so that the grain will run diagonally from the center to the ends, or, when made up in the basket, from the ends of said basket diagonally to the handle.

My invention comprises other novel features of construction and arrangement of parts, which will more fully appear hereinafter.

To enable others to more clearly understand my invention, I have illustrated the same in the accompanying drawings, in which—

Figure 1 is a side elevation of my improved basket. Fig. 2 is a longitudinal sectional view. Fig. 3 is a transverse sectional view on the line $x\ x$ of Fig. 1, and Fig. 4 is a sectional view on the line $y\ y$ of Fig. 2.

Referring to the drawings, in which like letters of reference denote corresponding parts in the several figures, A designates the bottom of my improved basket, which is preferably made of wood or other desirable material, and its thickness is varied as desired to suit baskets of different sizes, &c. The body of the basket is composed of two pieces B B', which are sawed and cut by dies into the proper shape; but any other means may be employed for obtaining said pieces without departing from the scope of my invention. These pieces are cut in such a manner that the grain will run substantially in curved lines from end to end of each piece, as indicated at $b$, and when the pieces are made up into a basket the grains will run diagonally from the ends of the box upward to the handle. This construction provides a strong body, the sides of which will not split or break where they are nailed and which will not become distorted or spread in ordinary usage. The ends of the side pieces are bent around the edges of the bottom B and overlapped at $b'$, and the handle C is secured over these overlapped ends by nails $c$ or other devices. These nails $c$ pass entirely through the handle and the overlapped ends of the side pieces, and they thus perform the double function of joining the side pieces together and fastening the handle in place. The side pieces are also fastened to the bottom by nails or other suitable means, and the direction of the grain prevents more than one nail from being in the same grain, thus obviating any danger of splitting.

The basket is so constructed that it will be somewhat wider and larger at the top than at the bottom, and it may be provided with any preferred form of cover, if desired.

It will be noticed that there are no hoops on my improved basket, which are found to interfere greatly with nesting and shipping, and by constructing the basket in this simple form of only four pieces the expense and trouble of manufacture are very much reduced.

I am aware that changes in the form and proportion of parts and details of construction of my invention can be made without departing from the spirit or sacrificing the advantages thereof, and I therefore reserve the right to make such changes as fairly fall within the scope of the same.

Having thus fully described my invention, what I claim as new, and desire to secure by Letters Patent, is—

1. The herein-described basket, comprising the body made of two pieces, each of which is bent to form one end of the basket and a portion of the sides thereof, the adjacent inner ends of said sides being overlapped about the middle of said body, the handle arranged over and fastened to the overlapped ends of the body-pieces, and the bottom arranged within the body-pieces and secured thereto, substantially as described.

2. A basket such as herein described, comprising the body made of two pieces, each of which is bent to form one end and a portion of each side of the basket, said body-pieces having their inner ends overlapped and arranged so that the grain extends in a curved line from end to end thereof, the handle having its ends arranged over said overlapped ends of the body-pieces, the transverse fastening devices extending through said ends and handle, and the bottom arranged within the body and suitably secured thereto, as and for the purpose described.

In testimony whereof I affix my signature in presence of two witnesses.

OREN STODDARD.

Witnesses:
 L. C. WAY,
 G. W. MERCHANT.